US012715975B2

(12) United States Patent
Tada et al.

(10) Patent No.: US 12,715,975 B2
(45) **Date of Patent: *Aug. 25, 2026**

(54) POLYESTER RECYCLING SYSTEM AND RECYCLING METHOD

(71) Applicant: Mitsubishi Chemical Corporation, Tokyo (JP)

(72) Inventors: Kazunobu Tada, Nagahama (JP); Toshihiro Hiraki, Osaka (JP); Tomohiro Suzuki, Nagahama (JP); Kiyonori Kuroda, Nagahama (JP)

(73) Assignee: Mitsubishi Chemical Corporation, Tokyo (JP)

( * ) Notice: Subject to any disclaimer, the term of this patent is extended or adjusted under 35 U.S.C. 154(b) by 844 days.

This patent is subject to a terminal disclaimer.

(21) Appl. No.: 17/954,092

(22) Filed: Sep. 27, 2022

(65) Prior Publication Data

US 2023/0024305 A1 Jan. 26, 2023

Related U.S. Application Data

(63) Continuation of application No. PCT/JP2021/008543, filed on Mar. 4, 2021.

(30) Foreign Application Priority Data

Mar. 31, 2020 (JP) ................................ 2020-065409
Dec. 16, 2020 (JP) ................................ 2020-208859

(51) Int. Cl.
*C08J 11/28* (2006.01)
*C08J 11/10* (2006.01)

(52) U.S. Cl.
CPC ............ *C08J 11/10* (2013.01); *C08J 2367/00* (2013.01)

(58) Field of Classification Search
USPC ................. 521/48.5; 528/190, 193, 194, 198
See application file for complete search history.

(56) References Cited

U.S. PATENT DOCUMENTS

| | | | |
|---|---|---|---|
| 5,628,832 | A | 5/1997 | Graham et al. |
| 5,698,378 | A | 12/1997 | Kawamoto |
| 6,663,929 | B1 | 12/2003 | Tabota et al. |
| 2001/0020483 | A1 | 9/2001 | Yamaguchi et al. |
| 2005/0027023 | A1 | 2/2005 | Masuda et al. |
| 2018/0371204 | A1 | 12/2018 | Shimizu et al. |
| 2021/0187790 | A1 | 6/2021 | Ohara et al. |

FOREIGN PATENT DOCUMENTS

| | | | | |
|---|---|---|---|---|
| CN | 109366800 | A | | 2/2019 |
| EP | 1683829 | A1 | | 7/2006 |
| EP | 3892694 | A1 | | 10/2021 |
| GB | 2130124 | A | | 5/1984 |
| JP | S53-094381 | A | | 8/1978 |
| JP | S54-066985 | A | | 5/1979 |
| JP | H107-266337 | A | | 10/1995 |
| JP | H108-146560 | A | | 6/1996 |
| JP | H08-176316 | A | | 7/1996 |
| JP | H09-271748 | A | | 10/1997 |
| JP | 2000-000879 | A | | 1/2000 |
| JP | 2000-025041 | A | | 1/2000 |
| JP | 2001-228594 | A | | 8/2001 |
| JP | 2001-310970 | A | | 11/2001 |
| JP | 2002-265665 | A | | 9/2002 |
| JP | 2004169005 | A | * | 6/2004 |
| JP | 2005-132901 | A | | 5/2005 |
| JP | 2005-264019 | A | | 9/2005 |
| JP | 2005-298354 | A | | 10/2005 |
| JP | 2005-321537 | A | | 11/2005 |
| JP | 2006-088334 | A | | 4/2006 |
| JP | 2009-291690 | A | | 12/2009 |
| JP | 2010-065230 | A | | 3/2010 |
| JP | 6631964 | B1 | | 1/2020 |
| JP | 2020-090094 | A | | 6/2020 |
| WO | 03/042288 | A1 | | 5/2003 |
| WO | 2017/154098 | A1 | | 9/2017 |
| WO | 2020/059516 | A1 | | 3/2020 |

OTHER PUBLICATIONS

JP-2004169005-A Machine Translation (Year: 2004).*
Official Action issued Oct. 12, 2021 in Japanese Application No. 2020-208859.
Official Action issued Feb. 15, 2022 in Japanese Application No. 2020-208859.
Official Action issued Oct. 12, 2021 in Japanese Application No. 2021-128598.
Third Party Submission issued Jan. 7, 2022 in Japanese Application No. 2021-128598.
Official Action issued Feb. 15, 2022 in Japanese Application No. 2021-128598.
International Search Report issued in related International Patent Application No. PCT/JP2021/008543 dated May 18, 2021.
Extended European Search Report issued Feb. 6, 2024 for European Patent Application No. 21779599.6.
Office Action issued in corresponding Chinese Patent Application No. 202180024926.2, dated Jun. 1, 2023.
Office Action issued in Indonesian Patent Application No. P00202210484, dated Mar. 22, 2024.
Decision of Refusal issued in corresponding Japanese Patent Application No. 2021-206472, dated Feb. 25, 2025.

(Continued)

*Primary Examiner* — Terressa Boykin
(74) *Attorney, Agent, or Firm* — Morgan, Lewis & Bockius LLP

(57) ABSTRACT

To provide a polyester recycling system including: a functional layer removing means of removing a functional layer from a laminated polyester film including a polyester film having on a surface thereof the functional layer as a recovered waste material, with a cleaning agent dissolving the polyester film; a recovery means of recovering the polyester film, from which the functional layer has been removed; and a production means of producing a recycled polyester product with the recovered polyester film as a raw material.

17 Claims, 1 Drawing Sheet

(56) References Cited

OTHER PUBLICATIONS

Office Action issued in corresponding Japanese Patent Application No. 2021-206472, dated Jul. 30, 2024.
Offer of Information issued in corresponding Korean Patent Application No. 10-2022-7033704, dated Sep. 23, 2024.
Third Party Submission issued in corresponding Japanese Patent Application No. 2020-208859, dated Feb. 18, 2022.
Third Party Submission issued in corresponding Japanese Patent Application No. 2021-128598, dated Jun. 3, 2022.
Third Party Submission issued in corresponding Japanese Patent Application No. 2021-206472, dated Nov. 9, 2023.
Third Party Submission issued in corresponding Japanese Patent Application No. 2021-206472, dated Nov. 22, 2022.
Third Party Submission issued in corresponding Japanese Patent Application No. 2021-206472, dated Nov. 28, 2024.
Office Action issued in Taiwanese Patent Application No. 110108491, dated Jul. 31, 2024.
Notice of Reasons for Refusal issued in corresponding Japanese Patent Application No. 2020-208859, dated Oct. 12, 2021 (English Machine translation only).
Notice of Reasons for Refusal issued in corresponding Japanese Patent Application No. 2021-128598, dated Oct. 12, 2021 (English Machine translation only).
Notice of Reasons for Refusal issued in corresponding Japanese Patent Application No. 2020-208859, dated Feb. 15, 2022 (English Machine translation only).
Notice of Reasons for Refusal issued in corresponding Japanese Patent Application No. 2021-128598, dated Feb. 15, 2022 (English Machine translation only).
Third Party Submission issued in corresponding Japanese Patent Application No. 2021-128598, dated Jan. 7, 2022 (English Machine translation only).
Reconsideration Report by Examiner before Appeal issued in Japanese Patent Application No. 2021-206472, dated Jul. 15, 2025.
Office Action issued in corresponding Korean Patent Application No. 10-2022-7033704, dated Dec. 3, 2025.

* cited by examiner

POLYESTER RECYCLING SYSTEM AND RECYCLING METHOD

TECHNICAL FIELD

The present invention relates to a polyester recycling system and a recycling method.

BACKGROUND ART

Waste plastics have been processed by landfill, ocean disposal, incineration, and the like, but there is an increasing difficulty in securement of landfill sites, and ocean disposal causes environmental problems since plastics are not decomposed.

Waste plastics can be utilized as heat through incineration, which however causes a problem that discharge of carbon dioxide therefrom leads the global warming.

According to the increasing consciousness to the environmental problems in recent years, there is a demand of recycling of waste plastics, such as reuse and regeneration, and research and developments therefor have been actively made. Most plastics are produced from fossil fuels, and the establishment of the recycle method is also demanded from the standpoint of the effective use of resources.

A polyester film as one of plastic films is useful as a base material film, and is frequently used in the form of a laminated film having various functional layers laminated on one surface or both surfaces thereof. The functional layers include a hardcoat layer, a pressure-sensitive adhesive layer, a decorative layer, a light shielding layer, a polarizing layer, an ultraviolet ray shielding layer, and the like, and a laminated film having a material corresponding to the functional layer laminated on a polyester film has been used.

The laminated films after use have been scarcely reused, but are subjected to disposal, incineration, or the like.

In trying to recycle a laminated film having a functional layer laminated thereon directly through remelting, the material constituting the functional layer is mixed in the molten polymer, and causes an abnormal odor in extrusion and decrease in melt viscosity of the polymer, which becomes a factor of breakage in film formation.

Even if a film can be produced therefrom, deterioration of the quality thereof due to coloration, contamination of foreign matters, and the like cannot be avoided.

In the case where the functional layer is removed by peeling, such as physical scraping, and then melt-extruded, the remaining functional layer clogs the filter in the filtering process in extrusion, which may cause a problem of failure in normal film formation.

As a recycle method of a laminated film, for example, PTL 1 describes a technique using a laminated film including a base material film having on at least one surface thereof an easily soluble functional layer and a surface functional layer laminated in this order. The laminated film having this configuration after use is cleaned with a solvent that can dissolve only the easily soluble functional layer but does not dissolve the base material film, and thereby the base material film is to be separated and recovered from the laminated film. The separated and recovered material is remelted to enable regeneration of the resin composition constituting the base material film.

CITATION LIST

Patent Literature

PTL 1: JP 2004-169005 A

SUMMARY OF INVENTION

Technical Problem

The method described in PTL 1 assumes the laminated film including a base material film having on a surface thereof an easily soluble resin layer and a surface functional layer laminated in this order as described above, and the functional layer is to be removed through dissolution of the easily soluble functional layer.

Accordingly, this technique lacks general versatility since most laminated polyester films having no easily soluble functional layer cannot be applied thereto.

In view of the circumstances, an object of the present invention is to propose a recycling system or a recycling method of a polyester film that can be applied versatilely.

Solution to Problem

As a result of earnest investigation by the present inventors, it has been found that the object can be achieved in such a manner that a laminated polyester film as a waste material is recovered, the functional layer thereof is removed with a particular cleaning agent, the polyester film, from which the functional layer has been removed, is recovered, and a recycled product is produced with the recovered polyester film as a raw material. The present invention has been completed based on the knowledge. Specifically, the present invention includes the following embodiments.

(1) A polyester recycling system including: a functional layer removing means of removing a functional layer from a laminated polyester film including a polyester film having on a surface thereof the functional layer as a recovered waste material, with a cleaning agent dissolving the polyester film; a recovery means of recovering the polyester film, from which the functional layer has been removed; and a production means of producing a recycled polyester product with the recovered polyester film as a raw material.

(2) The polyester recycling system according to the item (1), wherein the production means includes a pellet production means of pelletizing the polyester film, from which the functional layer has been removed.

(3) The polyester recycling system according to the item (1) or (2), wherein the cleaning agent contains an alkalinizing agent.

(4) The polyester recycling system according to any one of the items (1) to (3), wherein the polyester recycling system further includes a rinsing means of rinsing out the cleaning agent attached to the polyester film, from which the functional layer has been removed, in the functional layer removing means.

(5) The polyester recycling system according to any one of the items (1) to (4), wherein the waste material is a laminated polyester film in a roll form or a bulk form.

(6) The polyester recycling system according to any one of the items (1) to (5), wherein the polyester recycling system further includes an unwinding means or a cutting means, preceding the functional layer removing means.

(7) The polyester recycling system according to any one of the items (1) to (6), wherein a roll-to-roll method is applied to the polyester recycling system.

(8) A polyester recycling method including: a recovering step (A) of recovering a laminated polyester film including a polyester film having on a surface thereof a functional layer as a waste material; a functional layer removing step of removing the functional layer from the laminated polyester film, with a cleaning agent dissolving the polyester film; a recovering step (B) of recovering the polyester film, from which the functional layer has been removed; and a producing step of producing a recycled polyester product with the polyester film recovered in the recovering step (B) as a raw material.

(6) The polyester recycling method according to the item (8), wherein the producing step includes a pellet producing step of pelletizing the polyester film, from which the functional layer has been removed.

(10) The polyester recycling method according to the item (8) or (9), wherein the cleaning agent contains an alkalinizing agent.

(11) The polyester recycling method according to any one of the items (8) to (10), wherein the polyester recycling method further includes a rinsing step of rinsing out the cleaning agent attached to the polyester film, from which the functional layer has been removed, in the functional layer removing step.

(12) The polyester recycling method according to any one of the items (8) to (11), wherein in the recovering step (A), the waste polyester film in a roll form or a bulk form is recovered.

(13) The polyester recycling method according to any one of the items (8) to (12), wherein the polyester recycling method further includes an unwinding step or a cutting step, preceding the functional layer removing step.

(14) The polyester recycling method according to any one of the items (8) to (13), wherein the polyester recycling method is performed by a roll-to-roll method.

Advantageous Effects of Invention

According to the recycling system and the recycling method of the present invention, the functional layer can be removed from the laminated polyester film having the functional layer, and thereby the polyester (polyester base material) can be efficiently recovered and recycled.

DESCRIPTION OF EMBODIMENT

Figure 1:
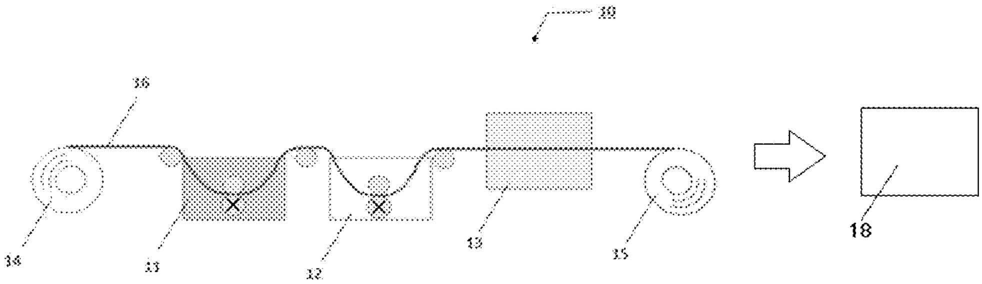
FIG. 1 is a conceptual illustration showing one embodiment of the recycling system of the present invention.

The recycling method of the present invention is a polyester recycling method including: a recovering step (A) of recovering a laminated polyester film including a polyester film having on a surface thereof a functional layer as a waste material; a functional layer removing step of removing the functional layer from the laminated polyester film, with a cleaning agent dissolving the polyester film; a recovering step (B) of recovering the polyester film, from which the functional layer has been removed; and a producing step of producing a recycled polyester product with the polyester film recovered in the recovering step (B) as a raw material.

<Recovering Step (A) of Laminated Polyester Film>

The recovering step of a laminated polyester film in the present invention is to recover a used laminated polyester film from the market. More specifically, for example, such a method is considered that a laminated polyester film having a functional layer sold to a customer is recovered as a used polyester film as a waste material in exchange for a new laminated polyester film delivered to the customer.

In the present invention, the kind and the recovered amount of the laminated polyester film to be recovered can be estimated by comprehending the kind, the delivered amount, and the delivery frequency of the delivered laminated polyester film in the customer list or the like. The recycling method of the present invention is a consistent recycling method that can make an estimation more precisely from the estimation and the actual recovered amount, and can comprehend in advance the kind and the necessary amount of the cleaning agent required for peeling the functional layer.

The laminated polyester film as a waste material may be stored in a roll form as similar to the delivered form in some cases, or may be in a bulk form in other cases. The recycling method of the present invention can efficiently recycle the waste material taking advantage of an unwinding method and a cutting method described later corresponding to the form of the waste material. The form of the waste material generally depends on the purpose of the laminated film, and therefore, in the recycling method of the present invention, what amount of the waste material in each shape (e.g., a roll form or a bulk form) to be recovered can be estimated.

(Laminated Polyester Film)

The laminated polyester film in the present invention means a film including a polyester film as a base material film having laminated on a surface thereof a functional layer, such as a resin layer.

The polyester film may have a single layer structure or a multilayer structure. The multilayer structure may be a two-layer structure, a three-layer structure, or a four-layer or larger multilayer structure, and the number of layers is not particularly limited. The polyester film may be a stretched film, such as a biaxially stretched film, or an unstretched film.

The polyester constituting the polyester film is not particularly limited, and a commercially available material may be appropriately used. Specific examples thereof include a polyester formed through polycondensation of a dicarboxylic acid and a diol, in which the dicarboxylic acid is preferably an aromatic dicarboxylic acid, and the diol is preferably an aliphatic glycol.

Examples of the aromatic dicarboxylic acid include terephthalic acid, 2,6-naphthalenedicarboxylic acid, isophthalic acid, and phthalic acid. Examples of the aliphatic glycol component include ethylene glycol, diethylene glycol, propylene glycol, butylene glycol, 1,4-cyclohexanedimethanol, and neopentyl glycol.

The polyester may be a homopolyester or a copolymer polyester. The polyester may contain a third component as a copolymerization component in addition to the aromatic dicarboxylic acid and the glycol.

Specific examples of the polyester include polyethylene terephthalate, polyethylene 2,6-naphthalate, polybutylene terephthalate, and polybutylene 2,6-naphthalate, and among these, polyethylene terephthalate is preferred. These materials may be a copolymer polyester, and for example, polyethylene terephthalate may have a dicarboxylic acid unit other than terephthalic acid in an amount of approximately 30% by mol or less of the dicarboxylic acid unit and may have a diol unit other than ethylene glycol in an amount of approximately 30% by mol or less of the diol unit.

The constitutional component of the functional layer is not particularly limited, and the functional layer is preferably constituted by a resin from the standpoint of the removal by the recovery method of the present invention. Examples of the functional layer include a pressure-sensitive adhesive layer, a hardcoat layer, a release layer, a decorative layer, a light shielding layer, an ultraviolet ray shielding layer, an adhesion promoting layer (primer layer), an antistatic layer, a refractive index regulating layer, and an oligomer blocking layer.

The pressure-sensitive adhesive layer is a layer that is provided for adhering to another equipment or the like under pressure, and the material for constituting the pressure-sensitive adhesive layer is not particularly limited, examples of which include a known pressure-sensitive adhesive resin, such as an acrylic resin, a rubber resin, and a silicone resin.

The hardcoat layer is a layer that is provided for imparting a scratch resistance and the like to the polyester film, and the material for forming the hardcoat layer is not particularly limited, examples of which include hardened materials of a monofunctional (meth)acrylate, a polyfunctional (meth) acrylate, and a reactive silicon compound, such as tetraethoxysilane.

The release layer is a layer that is provided for imparting a releasability to the polyester film, and for example, is a layer that is provided in a release film used as process paper for forming a green sheet used in the production of a ceramic electronic member, and an adhesion separator of an optical member used in the production of a flat panel display, such as a polarizing plate and an optical filter. The material for constituting the release layer is not particularly limited, examples of which include a material mainly containing a curable silicone resin, a modified silicone resin obtained through graft polymerization with a urethane resin, an epoxy resin, or the like, a long-chain alkyl group-containing compound, fluorine compound, and hydrocarbon wax.

The decorative layer is a layer for imparting a design property, and the material for constituting the decorative layer is not particularly limited, examples of which include a polyurethane resin, a vinyl resin, a polyamide resin, a polyester resin, an acrylic resin, and a polyvinyl acetal resin. A pigment, a dye, or the like is added to the resin for decoration.

The light shielding layer or the ultraviolet ray shielding layer is a layer that is provided for shielding the content from an ultraviolet ray, a visible ray, or the like, and the material for constituting the light shielding layer or the ultraviolet ray shielding layer is not particularly limited, examples of which include the resins described for the decorative layer, an inorganic filler, such as calcium carbonate, talc, clay, kaolin, silica, diatom earth, and barium sulfate, and an organic filler, such as wood powder, pulp powder, and cellulose powder.

The adhesion promoting layer (primer layer) is a layer that is provided for adhering another layer or film to the polyester film, and is not particularly limited, examples of which include a polyurethane resin, a vinyl resin, a polyamide resin, a polyester resin, an acrylic resin, and a polyvinyl acetal resin, and also a crosslinking agent and particles.

The antistatic layer is a layer that is provided for preventing static charge generated through contact with another material or peeling. The antistatic agent used in the antistatic layer is not particularly limited, examples of which include nonionic, cationic, anionic, and amphoteric surfactants, a conductive polymer, such as polypyrrole, polyaniline, poly (3,4-ethylenedioxythiophene), and poly(4-styrenesulfonate), a metal oxide filler, such as $SnO_2$ (Sb doped), $In_2O_3$ (Sn doped), and ZnO (Al doped), and a carbon compound, such as graphene, carbon black, and carbon nanotubes (CNT). These materials may be used alone or as a combination of two or more kinds thereof. The antistatic layer may also be formed of a resin composition containing an antistatic agent. Examples of the resin contained in the resin composition include a polyester resin, an acrylic resin, and a urethane resin.

The refractive index regulating layer is a layer that is provided for regulating the refractive index, and the material for constituting the refractive index regulating layer is not particularly limited, examples of which include a polyester resin, an acrylic resin, a urethane resin, a polycarbonate resin, an epoxy resin, an alkyd resin, a urea resin, a fluorine resin, and a metal oxide, such as zirconium oxide and titanium oxide. These materials may be used alone or as a combination of two or more kinds thereof.

The oligomer blocking layer is a layer that is provided for preventing whitening of the film after a heating process, and foreign matters, and is not particularly limited, and examples of the material for constituting the oligomer blocking layer include an amine compound and an ionic resin. The oligomer blocking layer may also be a highly crosslinked coating film.

These functional layers each may be a single layer or may include two or more kinds thereof laminated.

In the case where two or more kinds thereof are laminated, it is preferred that at least one layer is a layer constituted by a resin.

<Functional Layer Removing Step>

The functional layer removing step is a step of removing the functional layer from the laminated polyester film. The removing step of the functional layer may be a method of cleaning with a cleaning agent, so as to dissolve the functional layer itself, or to solve a part of the surface of the polyester film base material, thereby peeling the functional layer at the interface to the polyester film base material.

Specific examples thereof include an immersing method of immersing in a cleaning tank having the cleaning agent placed therein, a coating method of coating the cleaning agent in the form of a solution, and a spraying method of spraying the cleaning agent in the form of a solution or the vaporized cleaning agent. Among these, an immersing method is preferred from the standpoint of the permeability of the cleaning agent to the functional layer.

The temperature of the cleaning agent in the immersing method is preferably room temperature (20° C.) or more. In the case where the temperature thereof is room temperature (20° C.) or more, the cleaning liquid has a low viscosity, which facilitates permeation to the functional layer to provide a favorable cleanability. In this standpoint, the temperature of the cleaning agent in the immersing method is more preferably 40° C. or more, further preferably 50° C. or more, and particularly preferably 60° C. or more.

The upper limit value of the temperature of the cleaning agent in the case where the cleaning agent is used in the form of a solution is preferably a temperature of the boiling point or less. For the aqueous cleaning agent as a preferred embodiment of the present invention, the temperature is preferably 100° C. or less, and more preferably 90° C. or less.

The temperature of the cleaning liquid in cleaning may be the same as above in other methods than the immersing method. In the peeling and cleaning by the immersing method, microwave irradiation may be performed for the purpose of facilitating the hydrolysis reaction.

The pH of the cleaning agent is preferably 12 or more, and more preferably 13 or more, from the standpoint of the cleanability.

The immersion time is necessarily regulated appropriately corresponding to the kind of the cleaning target.

In the case where the cleaning target is a polyester film having an acrylic pressure-sensitive adhesive layer provided as the functional layer, the immersion time is preferably 1 second or more and 30 minutes or less. In the case where the immersion time is 1 second or more, the cleaning agent sufficiently permeates the functional layer to exert the cleanability. In the case where the immersion time is 30 minutes or less, the polyester film as the base material is not excessively dissolved to secure the amount of the resulting polyester in recovery. In this standpoint, the immersion time is more preferably 15 seconds or more and 20 minutes or less, further preferably 30 seconds or more and 15 minutes or less, and particularly preferably 1 minute or more and 10 minutes or less.

In the case where the cleaning target is a polyester film having an acrylic hardcoat layer provided as the functional layer, the immersion time is preferably 1 second or more and 30 minutes or less. In the case where the immersion time is 1 second or more, the cleaning agent sufficiently permeates the functional layer to exert the cleanability. In the case where the immersion time is 30 minutes or less, the polyester film as the base material is not excessively dissolved to secure the amount of the resulting polyester in recovery. In this standpoint, the immersion time is more preferably 15 seconds or more and 30 minutes or less, further preferably 30 seconds or more and 25 minutes or less, and particularly preferably 1 minute or more and 20 minutes or less.

In the case where the cleaning target is a polyester film having a silicone release layer provided as the functional layer, the immersion time is preferably 1 second or more and 30 minutes or less. In the case where the immersion time is 1 second or more, the cleaning agent sufficiently permeates the functional layer to exert the cleanability. In the case where the immersion time is 30 minutes or less, the polyester film as the base material is not excessively dissolved to secure the amount of the resulting polyester in recovery. In this standpoint, the immersion time is more preferably 15 seconds or more and 20 minutes or less, further preferably 30 seconds or more and 10 minutes or less, and particularly preferably 1 minute or more and 5 minutes or less.

The specific embodiment of the functional layer removing step depends on the form of the laminated polyester film as the waste material.

(Case of Roll Form)

In the case where the laminated polyester film as the waste material is in a roll form, it is preferred that an unwinding device is provided preceding the cleaning tank having the cleaning agent placed therein, and the laminated film is wound off from the device, and introduced to the cleaning tank for cleaning. It is preferred that the polyester film is continuously transferred to the subsequent recovering step (B).

In the course of from the functional layer removing step to the rinsing step described later, a device equipped with a physical means, such as a roll brush, ultrasonic wave, microbubbles or nanobubbles, a water current, or compressed cold air, may be provided for the purpose of efficiently removing the functional layer from the laminated polyester film.

(Case of Bulk Form)

In the case where the laminated polyester film as the waste material is in a bulk form, it is preferred that a cutting device is provided preceding the cleaning tank having the cleaning agent placed therein, and the laminated film is cut into a flake form, and introduced to the cleaning tank. With the flake form, the contact area between the laminated polyester film and the cleaning agent is increased to facilitate the penetration of the cleaning agent, and thus the functional layer can be efficiently removed. This embodiment preferably uses a method of introducing the laminated polyester film in a flake form continuously to the cleaning tank with a belt conveyer or the like. According to the embodiment, the cleaning can be performed with high productivity. In this embodiment, the cleaning may be performed in a batchwise manner.

<Recovering Step (B)>

After the functional layer removing step, the polyester film as the base material is recovered. A rinsing step and a drying step described later are preferably provided as the preceding steps of the recovering step. The method of recovering may be appropriately selected depending on the form of the laminated polyester film as the waste material.

In the case where the laminated polyester film as the waste material is in a roll form, the polyester film may be recovered by a roll-to-roll method, and may be wound up appropriately after the cleaning step, the rinsing step, and the drying step, thereby efficiently recovering.

In the case where the laminated polyester film as the waste material is in a bulk form, the cutting step is preferably provided before the functional layer removing step as described above. In this embodiment, it is preferred that the polyester in a flake form is recovered by continuously passing through the rinsing step and the drying step with a belt conveyer or the like.

It is advantageous from the standpoint of the handleability that the polyester film thus recovered in the aforementioned manner is formed into pellets.

<Rinsing Step>

In the present invention, a rinsing step of rinsing out the cleaning agent is preferably provided after the functional layer removing step and before the recovering step (B). Specifically, the rinsing step means a step of rinsing out the cleaning agent attached to the polyester film, from which the functional layer has been removed, with a rinsing liquid.

The rinsing liquid is not particularly limited, as far as the cleaning agent can be rinsed out therewith. In the case where the aqueous cleaning agent as a preferred embodiment of the present invention is used, water can be used in the rinsing step.

The temperature in the rinsing step is preferably around room temperature, and specifically is preferably 5 to 50° C., and more preferably 5 to 30° C., from the standpoint of efficiently rinsing out.

Examples of the method of rinsing out the cleaning agent include a spraying method of spraying the rinsing liquid onto the polyester film, from which the functional layer has been removed, and an immersing method of immersing the polyester film in a rinsing tank having the rinsing liquid placed therein. In the case where the cleaning agent that is not necessarily rinsed out is used, the rinsing step can be omitted.

The functional layer peeled from the polyester film may also be rinsed out simultaneously with the cleaning agent in some cases. The organic solvent or water used in the rinsing step and the material constituting the functional layer are then separated, the organic solvent or water can be reused in the rinsing step, and the material constituting the functional layer can also be reused.

<Drying Step>

A drying step is preferably performed after the rinsing step. The cleaning agent and/or the rinsing liquid remaining on the polyester film can be removed by the drying step. In the case where the rinsing step is omitted, the drying step may be performed after the functional layer removing step (A).

The condition of the drying step is not particularly limited, and the polyester film is generally dried at 70 to 150° C. for a period of time of approximately 1 to 30 minutes. The drying method used may be an ordinary method, such as drying by heating with an infrared heater, an oven, or the like, hot air drying with a hot air dryer or the like, and drying by microwave heating.

<Recycled Polyester Product Producing Step>

A recycled polyester product is produced by recycling the polyester film recovered in the recovering step (B) as a raw material. It is preferred that the polyester is pelletized by a pellet producing step described later preceding the producing step, and then a recycled polyester product described later is produced with the pellets.

<Pellet Producing Step>

The dried polyester film is preferably processed into pellets by a pellet producing step. In particular, in the case where the laminated polyester film as a waste material is in a bulk form, the polyester film is cut as described above, and the resulting recycled polyester is in a flake form. The handleability of the polyester in a flake form is significantly enhanced through the pelletization.

The pellets not only are advantageous in handleability, but also have advantages in storage, subsequent processing, and the like.

<Recycled Polyester Product>

The polyester film obtained by the recovering method of the present invention can be used as a raw material of a polyester, and can be reused as a so-called recycled polyester product. Specifically, the recovered polyester can be pelletized and stored as a polyester in a pellet form (polyester product). The recovered polyester can also be molded into various polyester products, such as a polyester film, through melt extrusion or the like. It is preferred that the recovered polyester is once pelletized and then molded into various products from the standpoint of the productivity thereof.

The recycled polyester can be applied to the same applications as the ordinary polyester products, and for example, can be used as a polyester film as a base material film. A functional layer may be formed on the base material film, so that the recycled polyester can be reused as a laminated film.

The recycled polyester can also be used after mixing with a polyester produced by the ordinary method, and can also be formed into a multilayer film using the recycled polyester and a polyester produced by the ordinary method.

The recycled polyester product may also be applied to various applications in addition to the films, and for example, PET bottles, polyester fibers, polyester sheets, polyester containers, and the like can be produced therewith.

The functional layer having been peeled therefrom can also be recovered and reused depending on necessity.

<Cleaning Agent>

The cleaning agent used in the functional layer removing step is not particularly limited, as far as the cleaning agent has a function of dissolving the polyester film as the base material, and preferably contains an alkalinizing agent. A preferred cleaning agent is determined corresponding to the kind of the functional layer, and is preferably prepared in advance. In the present recycling system, it is preferred to manage various information consistently based on the customer list or the like as described above, and thereby the cleaning agent, the cleaning tank, and the like can be prepared without being wasted.

(Cleaning Agent Containing Alkalinizing Agent)

The cleaning agent containing an alkalinizing agent is effective, for example, for a pressure-sensitive adhesive film and a hardcoat film having an acrylic functional layer. Specifically, a cleaning agent containing an alkalinizing agent (a) and a compound (b) having at least one hydroxy group is preferred.

Even for the laminated film having a functional layer that is not decomposed or dissolved by the cleaning agent containing an alkalinizing agent, such as a release film having a silicone functional layer, the polyester film itself as the base material is eluted through ester exchange reaction, saponification, ionization, and the like with the cleaning agent, and thereby the functional layer thereon can be peeled and removed.

(Alkalinizing Agent)

The alkalinizing agent (which may be hereinafter referred to as a component (a)) alkalinizes the cleaning liquid, and may also be referred to as an alkaline agent. The alkalinizing agent may be either an inorganic alkalinizing agent or an organic alkalinizing agent.

Examples of the inorganic alkalinizing agent include a hydroxide of an alkali metal, such as sodium hydroxide, potassium hydroxide, rubidium hydroxide, and cesium hydroxide; a hydroxide of an alkaline earth metal, such as calcium hydroxide and barium hydroxide; a carbonate of an alkali metal, such as sodium carbonate and potassium carbonate; a phosphate of an alkali metal, such as trisodium phosphate, sodium pyrophosphate, sodium tripolyphosphate, sodium tetrapolyphosphate, tripotassium phosphate, potassium pyrophosphate, and potassium tripolyphosphate; a silicate of an alkali metal, such as sodium orthosilicate, sodium metasilicate, and potassium silicate; and ammonia.

The inorganic alkalinizing agent in the cleaning agent is preferably a hydroxide of an alkali metal, more preferably sodium hydroxide or potassium hydroxide from the standpoint of the availability, and particularly preferably potassium hydroxide from the standpoint of the cleanability.

The inorganic alkalinizing agent in the cleaning agent may be used alone or as a combination of two or more kinds thereof. In particular, the combination use of potassium hydroxide and sodium hydroxide is preferred from the standpoint of the effects and the handleability.

Examples of the organic alkalinizing agent include an organic amine compound, such as N,N-bis(2-hydroxyethyl)-N-cyclohexylamine, diazabicycloundecene, diazabicyclononene, monomethylamine, dimethylamine, trimethylamine, monoethanolamine, diethanolamine, triethanolamine, morpholine, 2-(dimethylamino) ethanol, 2-(diethylamino) ethanol, 1-amino-2-propanol, and triisopropanolamine.

There may be a case where a compound having at least one hydroxy group is contained as the organic alkalinizing agent, and the compound that has an acidity constant (pKa) of 30 or more is treated as the alkalinizing agent.

The organic alkalinizing agent in the cleaning agent is preferably monoethanolamine, diethanolamine, or triethanolamine from the standpoint of the general versatility, preferably monoethanolamine or diethanolamine from the standpoint of the availability, and particularly preferably monoethanolamine from the standpoint of the cleanability.

A combination use of an inorganic alkalinizing agent and an organic alkalinizing agent is also preferred from the standpoint of the cleanability, and specifically, a combination of at least one kind of an inorganic alkalinizing agent of sodium hydroxide and potassium hydroxide and at least one kind of an organic alkalinizing agent selected from monoethanolamine, diethanolamine, triethanolamine, morpholine, 2-(dimethylamino) ethanol, 2-(diethylamino) ethanol, 1-amino-2-propanol, and triisopropanolamine is more preferred, and a combination of at least one kind of an inorganic alkalinizing agent of sodium hydroxide and potassium hydroxide and at least one kind of an organic alkalinizing agent selected from monoethanolamine and diethanolamine is particularly preferred.

The content of the alkalinizing agent in the total cleaning agent is preferably 1 to 50% by mass, more preferably 2 to 45% by mass, and further preferably 3 to 40% by mass. In the case where the content thereof is in the range, the sufficient effects as the cleaning agent can be obtained.

(Compound Having at Least One Hydroxy Group)

The cleaning agent containing an alkalinizing agent preferably contains a compound having at least one hydroxy group (which may be hereinafter referred to as a component (b)).

Examples of the compound having at least one hydroxy group constituting the cleaning agent include an alcohol compound and a phenol compound.

Examples of the alcohol compound include a monohydric alcohol, such as methyl alcohol, ethyl alcohol, propyl alcohol, butyl alcohol, benzyl alcohol, ethylene glycol monomethyl ether, diethylene glycol monobutyl ether, propylene glycol monomethyl ether, propylene glycol monoethyl ether, and hexafluoro-2-propanol; a dihydric alcohol, such as ethylene glycol, diethylene glycol, and propylene glycol; and a polyhydric alcohol, such as glycerin.

Examples of the phenol compound include phenol, xylenol, salicylic acid, picric acid, naphthol, catechol, resorcinol, hydroquinone, pyrogallol, phloroglucinol, dibutylhydroxytoluene, bisphenol A, cresol, estradiol, eugenol, gallic acid, guaiacol, picric acid, phenolphthalein, serotonin, dopamine, adrenaline, noradrenaline, thymol, tyrosine, and hexahydroxybenzene.

These compounds may be used alone or as a combination of two or more kinds thereof, and from the standpoint of enhancing the peeling and cleaning effect, two or more kinds thereof are preferably used in combination, and two or more kinds of the alcohol compounds are more preferably used in combination.

Among these, an alcohol compound is preferred from the standpoint of retaining the cleanability while preventing the alkalinity of the cleaning agent from being impaired and the standpoint of facilitating the dissolution of the polyester film base material.

An ester exchange reaction occurs at the ester bonding site of the polyester film with an alkoxide formed from the hydroxy group of the alcohol compound, so as to provide a low molecular weight compound. Subsequently, the ester bond of the low molecular weight compound receives a nucleophilic attack of a hydroxy group ionized from the alkalinizing agent (b) to cause a saponification reaction providing a carboxylate (ionization). It is estimated that the dissolution of the polyester film is facilitated.

The acidity constant (pKa) of the alcohol compound is preferably in a range of 8.0 or more and 20.0 or less, more preferably 8.0 or more and 18.0 or less, further preferably 9.0 or more and 16.0 or less, particularly preferably in a range of 9.0 or more 15.6 or less, and most preferably 9.3 or more and 15.4 or less, from the standpoint of the cleanability.

In the case where the acidity constant (pKa) of the alcohol compound is in the range, an alkoxide is formed without impairing the alkalinity of the cleaning agent, and thereby the cleaning capability of the cleaning agent can be enhanced.

The acidity constants (pKa) of some alcohol compounds are shown below: hexafluoro-2-propanol (pKa=9.3), benzyl alcohol (pKa=15.4), methanol (pKa=15.5), ethanol (pKa=16.0), 1-propanol (pKa=16.1), 2-propanol (pKa=17.1), 1-butanol (pKa=16.1), and tert-butanol (pKa=18.0).

It can be said from the values of the acidity constants (pKa) of the alcohols shown above that an alcohol compound having an acidity constant (pKa) of 15.4 or less is an alcohol compound having a smaller acidity constant (pKa) than methanol. Furthermore, it can be said that an alcohol compound having an acidity constant (pKa) of 9.3 or more is an alcohol compound having an acidity constant (pKa) of hexafluoro-2-propanol or more.

Preferred Embodiment 1 of Component (b)

Among the above, hexafluoro-2-propanol, methyl alcohol, ethyl alcohol, propyl alcohol, and benzyl alcohol are more preferred from the standpoint of the cleanability. These alcohol compounds easily form an alkoxide through dissociation of a proton to achieve a high cleanability. Among these, hexafluoro-2-propanol having a high cleanability is preferred.

The combination use of hexafluoro-2-propanol and another alcohol compound is also preferred for the purpose of regulating the cleaning capability. In this case, the combination use of hexafluoro-2-propanol and methyl alcohol, the combination use of hexafluoro-2-propanol and ethyl alcohol, and the combination use of hexafluoro-2-propanol and benzyl alcohol are preferred.

In the case where hexafluoro-2-propanol and another monohydric alcohol compound are used in combination as the alcohol compound, the mass ratio thereof (hexafluoro-2-propanol/another monohydric alcohol compound) is preferably 1/1 to 1/100, more preferably 1/3 to 1/41, further preferably 1/4 to 1/20, and particularly preferably 1/5 to 1/10.

Even in the case where two or more kinds of the monohydric alcohol compounds are used in combination, a dihydric alcohol and a polyhydric alcohol may further be used in combination.

Preferred Embodiment 2 of Component (b)

Among the above, benzyl alcohol is preferably used from the standpoint of the low volatility and the usable temperature range.

Preferred Embodiment 3 of Component (b)

Furthermore, in particular, two or more kinds thereof are preferably used from the standpoint of enhancing the peeling and cleaning effect, and in the combination use of two or more kinds thereof, a combination of a hydrophobic monohydric alcohol and a water soluble monohydric alcohol is preferred from the standpoint of exerting the peeling and cleaning effect widely and synergistically, irrespective of the properties of the coating film. The hydrophobic monohydric alcohol means a monohydric alcohol that is not miscible with water and is separated therefrom into two layers, and the water soluble monohydric alcohol is a monohydric alcohol that is miscible with water to form one layer.

Among the above, it is preferred that benzyl alcohol as the hydrophobic monohydric alcohol and one or more kind selected from hexafluoro-2-propanol, methyl alcohol, ethyl alcohol, and propyl alcohol as the water soluble monohydric alcohol are used in combination, and in particular, it is most preferred that benzyl alcohol and hexafluoro-2-propanol are used in combination, or benzyl alcohol and methyl alcohol are used in combination.

The blending ratio in the case where two or more kinds of the alcohol compounds are used in combination is not particularly limited, and the mass ratio of hydrophobic monohydric alcohol/water soluble monohydric alcohol is preferably 1/1 to 10/1, and more preferably 1.5/1 to 10/1, from the standpoint of further enhancing the peeling and cleaning effect.

Even in the case where two or more kinds of the monohydric alcohol compounds are used in combination, a dihydric alcohol and a polyhydric alcohol may further be used in combination.

The content of the compound (b) in the cleaning agent in the present invention is preferably 10 to 99% by mass, more preferably 20 to 98% by mass, and further preferably 30 to 97% by mass. In the case where the content is in the range, the amount of the alkalinizing agent (a) can be appropriate to suppress the foreign matter contamination due to the deposition of the alkalinizing agent component in recovering the polyester film while retaining the favorable cleanability, and thereby the quality of the recycled polyester film can be retained.

Particularly preferred embodiments of the cleaning agent in the present invention include a combination of (W) or (X) and (Y) or (Z) from the standpoint of the cleanability.

- (W) An alkali metal hydroxide, particularly sodium hydroxide or potassium hydroxide, is contained as the alkalinizing agent (a) (alkaline agent).
- (X) An alkali metal hydroxide, particularly sodium hydroxide or potassium hydroxide, is contained, and an organic alkalinizing agent is also contained, as the alkalinizing agent (a) (alkaline agent).
- (Y) At least hexafluoro-2-propanol, methyl alcohol, ethyl alcohol, propyl alcohol, or benzyl alcohol, particularly benzyl alcohol, is contained as the compound (b) having at least one hydroxy group.
- (Z) At least an alcohol compound having an acidity constant (pKa) in a range of 9.3 or more and 15.4 or less, i.e., an alcohol compound having an acidity constant (pKa) of the acidity constant (pKa) of hexafluoro-2-propanol or more and smaller than methanol, is contained as the compound (b) having at least one hydroxy group.

The cleaning agent containing an alkalinizing agent in the present invention is preferably an aqueous cleaning agent. The aqueous cleaning agent is obtained by dissolving the components (a) and (b) in water or by diluting the components with water. The aqueous cleaning agent has relatively high safety since the flashing point thereof can be increased, and is also advantageous since water can be used in a rinsing step described later.

The cleaning agent may further contain various additives in addition to the component (a) and the component (b). For example, a surfactant, an antioxidant, a rust inhibitor, a pH modifier, an antiseptic, a viscosity modifier, a defoaming agent, and the like may be added.

(Surfactant)

The surfactant is not particularly limited, and any of an anionic surfactant, a cationic surfactant, a nonionic surfactant, and an amphoteric surfactant may be used.

Examples of the anionic surfactant include an alkylsulfonic acid, an alkylbenzenesulfonic acid, an alkylcarboxylic acid, an alkylnaphthalenesulfonic acid, an α-olefinsulfonic acid, a dialkylsulfosuccinic acid, an α-sulfonated fatty acid, N-methyl-N-oleyltaurine, a petroleum sulfonic acid, an alkyl sulfonic acid, sulfated fat and oil, a polyoxyethylene alkyl ether sulfate, a polyoxyethylene stylenated phenyl ether sulfate, an alkylphosphoric acid, a polyoxyethylene alkyl ether phosphate, a polyoxyethylene alkyl phenyl ether phosphate, a naphthalenesulfonic acid formaldehyde condensate, and salts of these compounds.

Examples of the cationic surfactant include a quaternary ammonium, a tetraalkylammonium, a trialkylbenzylammonium, an alkylpyridinium, a 2-alkyl-1-alkyl-1-hydroxyethylimidazolinium, an N,N-dialkylmorpholinium, a polyethylene polyamine fatty acid amide, a urea condensate of a polyethylene polyamine fatty acid amide, a quaternary ammonium of a urea condensate of a polyethylene polyamine fatty acid amide, and salts of these compounds.

Examples of the nonionic surfactant include a polyoxyalkylene ether, such as a polyoxyethylene alkyl ether and a polyoxyethylene-polyoxypropylene alkyl ether; a polyoxyethylene alkyl phenyl ether, a polyoxyethylene polystylyl phenyl ether, a polyoxyethylene-polyoxypropylene glycol, a polyhydric alcohol fatty acid partial ester, a polyoxyethylene polyhydric alcohol fatty acid partial ester, a polyoxyethylene fatty acid ester, a polyglycerin fatty acid ester, a polyoxyethylenated castor oil, a fatty acid diethanolamide, a polyoxyethylene alkylamine, a triethanolamine fatty acid partial ester, and a trialkylamine oxide.

Examples of the amphoteric surfactant include a betaine compound (such as an N,N-dimethyl-N-alkyl-N-carboxymethylammonium betaine, an N,N,N-trialkyl-N-sulfoalkyleneammonium betaine, an N, N-dialkyl-N,N-bispolyoxyethyleneammonium sulfate ester betaine, and a 2-alkyl-1-carboxymethyl-1-hydroxyethylimidazolinium betaine) and an aminocarboxylic acid (such as an N,N-dialkylaminoalkylenecarboxylate salt).

(Antioxidant)

The antioxidant is not particularly limited, and an amine antioxidant, a phenol antioxidant, and the like may be used.

(Rust Inhibitor)

Examples of the rust inhibitor include an inorganic compound, such as a chromate salt, a molybdate salt, and sodium nitrite.

(pH Modifier)

Examples of the pH modifier include lactic acid, carbon dioxide, succinic acid, gluconic acid, citric acid, trisodium citrate, malic acid, and phosphoric acid.

(Antiseptic)

Examples of the antiseptic include a paraben compound, benzoic acid, sodium benzoate, sorbic acid, a propionate salt compound, dehydroacetic acid, sulfur dioxide, and a sodium pyrosulfite compound.

(Viscosity Modifier)

Examples of the viscosity modifier include a polymer compound and lamellar inorganic particles.

(Defoaming Agent)

Examples of the defoaming agent include a fluorine compound, a silicone compound, a polyether compound, an acetylene glycol compound, and a chelating agent, represented by EDTA.

<Polyester Recycling System>

The polyester recycling system of the present invention includes a functional layer removing means, a recovery means for the polyester film, from which the functional layer has been removed, and a production means of a recycled polyester product with the recovered polyester film as a raw material. The system recycles a laminated polyester film as a recovered waste material. The recovering method of the waste material has been described above.

In a preferred embodiment, the system may include an unwinding means, a cutting means, or the like preceding the cleaning device, corresponding to the form of the polyester film as a waste material, as described above.

In the case where the polyester film as a waste material is in a roll form, an unwinding means is preferably provided, and a so-called roll-to-roll system that performs winding up also with a roll is preferred since the recycled polyester can be efficiently obtained.

In the case where the polyester film as a waste material is in a bulk form, a cutting means is preferably provided. The waste material is formed into a flake form by cutting, and the cleaning means can be performed efficiently as described above.

Figure 2:
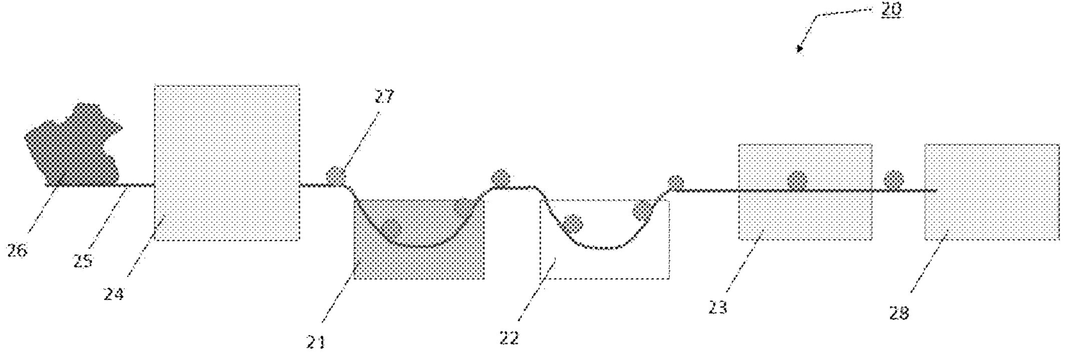
FIG. 2 is a conceptual illustration showing another embodiment of the recycling system of the present invention.

The polyester recycling system of the present invention will be described in detail below with reference to the conceptual illustrations shown in FIGS. 1 and 2. FIG. 1 shows the case where the laminated polyester film as a waste material is in a roll form, and FIG. 2 shows the case where the laminated polyester film as a waste material is in a bulk form.

In the case where the waste material is in a roll form, as shown in FIG. 1, an unwinding means (unwinding roll) 14 that unwinds the laminated polyester film in a roll form is preferably provided. The laminated film 16 thus wound off is cleaned with the cleaning agent by the functional layer removing means 11, and thereby the functional layer is peeled and removed. FIG. 1 shows an example of the functional layer removing means 11 that is an immersing device having a cleaning tank filled with the cleaning agent, in which the laminated film is immersed, and a coating device of coating the cleaning agent on the laminated polyester film or a spraying device of spraying the cleaning agent to the laminated polyester film may also be used. Among these, the immersing method using the immersing device is preferred.

Subsequently, the cleaning agent attached to the polyester film base material used in the functional layer removing means 11 is preferably rinsed out by a rinsing means 12. FIG. 1 shows an example of an immersing device in which an immersion tank is filled with a rinsing liquid, in which the polyester film is immersed similarly to the functional layer removing means, and a spraying device of spraying the rinsing liquid to the polyester film base material, from which the functional layer has been removed, or the like may also be used.

The polyester film base material, from which the functional layer has been removed, is dried by a drying means 13, from which the rinsing liquid is removed. The rinsing means 12 may be omitted, and in the case where the rinsing means 12 is omitted, the cleaning agent is removed by the drying means. The drying means is not particularly limited, and a known drying device, such as an oven for drying under heat and a hot air dryer, may be used.

In the case where the waste material is a laminated polyester film in a roll form, an embodiment in which the waste material is wound with an unwinding means (winding roll) 15 is preferred. Specifically, the so-called roll-to-roll system shown in FIG. 1 is efficient and preferred.

The dried and wound polyester film base material is then preferably pelletized by a pellet producing device 18. The pellet producing device 18 is not particularly limited, as far as the device can melt the polyester film base material to form pellets, and for example, a known extruder may be used, in which the polyester film base material is melted with the extruder, and the extruded polyester is pelletized. The polyester film base material may be delivered from the winding means, then appropriately miniaturized, and then placed in the extruder, and examples of the miniaturizing means include a known pulverizer or cutter.

The case where the laminated polyester film as a waste material is in a bulk form will be described with reference to FIG. 2. In the case where the laminated polyester film as a waste material is in a bulk form 26, the waste material is preferably formed into the laminated polyester film in a flake form 27 by a cutting means 24.

The polyester film formed into a flake form is conveyed to a functional layer removing means 21 with a belt conveyer 25, and cleaned with the cleaning agent to peel the functional layer. FIG. 2 also shows an example of the functional layer removing means 21 that is the method of immersing the laminated film in an immersion tank having the cleaning agent therein.

Thereafter, the cleaning agent used in the functional layer removing means 21 is preferably rinsed out by a rinsing means 22, and the polyester film is dried by a drying means 23, thereby providing a recycled polyester in a flake form. The resulting polyester in a flake form is then pelletized with a pellet producing device 28. The pellet producing device 28 may be the same as the pellet producing device 18, but the miniaturizing means may be omitted since the polyester has bee in a flake form.

In the embodiment shown in FIG. 2, the series of means is advantageously performed by using the belt conveyer 25 from the standpoint of the productivity, but other conveying means than the belt conveyer 25 may also be used.

The aforementioned polyester recycling systems are embodiments, and the means constituting the system may be appropriately modified or changed in such a range that does not impair the effects of the present invention.

<Waste Liquid Treatment System for Peeling and Cleaning Liquid>

The waste liquid of the peeling and cleaning liquid used in the present invention may be used again as a raw material of the peeling and cleaning liquid after isolating the effective components by a known separation and purification method, and may also be subjected to a disposal treatment from the standpoint of operation.

The case where the disposal treatment is performed includes a method of disposal in a sewage disposal tank equipped with a biological oxidation tank, an aeration tank, a sedimentation tank, a chlorine disinfection tank, a sludge tank, and the like capable of purifying the waste liquid.

In the waste liquid treatment with a sewage disposal tank, the waste liquid cannot be discarded unless the chemical oxygen demand (COD) and the biological oxygen demand (BOD) are below the prescribed values, and therefore it is necessary to purify the waste liquid to a certain extent in advance.

The amount of the waste liquid may be reduced in advance, for example, through concentration of the waste liquid.

Examples of the advance treatment include: a coagulation-sedimentation method in which a coagulant is added to the waste liquid to separate into a treated sewage and a coagulated matter, which each are then discarded; a filter separation method in which the waste liquid is separated into a treated sewage and a concentrated liquid with an UF filter or the like, which each are then discarded; a reduced pressure distillation method and an evaporative concentration method in which the waste liquid is heated under reduced pressure or under ordinary pressure to evaporate the solvent, thereby separating into a treated sewage and a concentrated liquid, which each are then recovered or discarded; a redox method (such as an ozone decomposition method) in which the organic matters in the waste liquid are decomposed to $CO_2$ and water through an oxidation treatment or the like; and a biotreatment method in which the organic matters in the waste liquid are decomposed through a biotreatment.

EXAMPLES

The present invention will be described in more detail with reference to examples. However, the present invention is not limited to the examples described below.

<Evaluation Methods>

(1) Immersion Test

The cleaning agents prepared in Examples and Comparative Examples each were placed in a 30 mL tank, in which a laminated film was immersed. The temperature of the cleaning agent, the immersion time, and the specimen size were as shown in the tables.

(2) Evaluation of Peeling of Functional Layer (2-1) Visual Evaluation (Laminated Polyester Film Having Pressure-Sensitive Adhesive Layer and Laminated Polyester Film Having Hardcoat Layer)

The immersed laminated film was taken out, and the surface thereof was visually observed and evaluated by the following standard.

- s (superior): The functional layer was dissolved or peeled, which was particularly practically favorable.
- a (good): A part of the functional layer was dissolved or peeled, which caused no practical problem.
- b (fair): A small part of the functional layer was dissolved or peeled.
- c (poor): The functional layer remained and caused a practical problem.

(2-2) Fluorescent X-Ray Analysis (Laminated Polyester Film Having Silicone Release Layer)

The surface of the cleaned laminated film was subjected to quantitative analysis of Si element with a fluorescent X-ray analyzer (XRF, "XRF-1800", produced by Shimadzu Corporation).

The removal rate of the functional layer was measured under assumption that the Si element amount on the surface of the laminated polyester film before cleaning was 100%, and the Si element amount of the plain film having no functional layer of the laminated film was 0%.

- s (superior): Removal rate of 90 to 100%
- a (good): Removal rate of 70 to 89%
- c (poor): Removal rate of 0 to 69%

(3) Evaluation of Intrinsic Viscosity (IV)

1 g of the polyester was precisely weighed and dissolved by adding 100 mL of a mixed solvent of phenol/tetrachloroethane=50/50 (weight ratio), and the limiting viscosity was measured at 30° C.

(4) Evaluation of Dissolution of Polyester Film

The polyethylene terephthalate film was immersed in the cleaning agent under the condition shown in Table 1, and the change of the thickness of the polyester film base material was measured by measuring the thickness with "Thickness Gauge ID-C112X/1012X", produced by Mitsutoyo Corporation.

The case where the thickness change was 3 μm or more was evaluated as A, and the case where the thickness change was less than 3 μm was evaluated as B. A thickness change of 3 μm or more is estimated that the functional layer is peeled through the progress of dissolution of the polyester film base material by the immersion into the cleaning agent.

(Laminated Polyester Film Having Functional Layer)

The following laminated polyester films having a functional layer (I) to (III) were prepared as specimens.

(I) Laminated Film (Laminated Polyester Film Having an Acrylic Pressure-Sensitive Adhesive Layer):

Commercially available product ("PET 75-H120 (10) Blue", produced by NEION Film Coatings Corporation), thickness of polyethylene terephthalate film: 75 μm, thickness of acrylic pressure-sensitive adhesive layer: 10 μm (II) Laminated Film (Laminated Polyester Film Having an Acrylic Hardcoat Layer):

A laminated polyester film having an acrylic hardcoat layer was obtained in the following manner.

(Preparation of Acrylic Hardcoat Solution)

24 parts by weight of dipentaerythritol hexaacrylate, 6 parts by weight of 2-hydroxy-3-phenoxypropyl acrylate, 1.5 parts by weight of a photopolymerization initiator (Omnirad 184, a trade name, produced by IGM Resins BV), and 70 parts by weight of toluene were mixed to provide a mixed coating liquid, which was designated as the acrylic hardcoat solution.

(Preparation of Acrylic Hardcoat Film)

The acrylic hardcoat solution was coated on a polyethylene terephthalate film (commercially available product, "Diafoil", produced by Mitsubishi Chemical Corporation) to a dry film thickness of approximately 9 μm, and cured through irradiation of an ultraviolet ray, so as to provide a laminated polyester film having an acrylic hardcoat layer.

(III) Laminated Film (Laminated Polyester Film Having a Silicone Release Layer):

Commercially available product ("MRF 38", produced by Mitsubishi Chemical Corporation), thickness of polyethylene terephthalate film: 38 μm, limiting viscosity of polyethylene terephthalate film: 0.67

Example 1

5 parts by mass of potassium hydroxide as the component (a), 40 parts by mass and 10 parts by mass respectively of benzyl alcohol and xylenol as the component (b), and 45 parts by mass of water as another component were mixed to prepare a cleaning agent (pH=13 or more).

The cleanability was evaluated with the laminated films (I) to (III) under the condition shown in Table 1. The results are shown in Table 1.

Example 2

5 parts by mass of potassium hydroxide, 5 parts by mass of sodium hydroxide, and 19 parts by mass of ethanolamine as the component (a), 40 parts by mass of benzyl alcohol and 1 part by mass of propylene glycol as the component (b), and 30 parts by mass of water as another component were mixed to prepare a cleaning agent (pH=13 or more).

The cleanability was evaluated with the laminated films (I) to (III) under the condition shown in Table 1. The results are shown in Table 1.

Example 3

5 parts by mass of potassium hydroxide, 5 parts by mass of sodium hydroxide, and 10 parts by mass of monoethanolamine as the component (a), 16 parts by mass of benzyl alcohol as the component (b), and 64 parts by mass of water as another component were mixed to prepare a cleaning agent (pH=13 or more).

The cleanability was evaluated with the laminated films (I) and (III) under the condition shown in Table 1. The results are shown in Table 1.

Example 4

5 parts by mass of potassium hydroxide as the component (a) and 95 parts by mass of benzyl alcohol as the component (b) were mixed to prepare a cleaning agent (pH=13 or more).

The cleanability was evaluated with the laminated films (I) and (III) under the condition shown in Table 1. The results are shown in Table 1.

Example 5

5 parts by mass of potassium hydroxide as the component (a) and 95 parts by mass of methanol as the component (b) were mixed to prepare a cleaning agent (pH=13 or more).

The cleanability was evaluated with the laminated film (III) under the condition shown in Table 1. The results are shown in Table 1.

Example 6

5 parts by mass of potassium hydroxide as the component (a) and 95 parts by mass of ethanol as the component (b) were mixed to prepare a cleaning agent.

The cleanability was evaluated with the laminated films (I) and (III) under the condition shown in Table 1. The results are shown in Table 1.

Example 7

5 parts by mass of potassium hydroxide, 5 parts by mass of sodium hydroxide, and 17.9 parts by mass of ethanolamine as the component (a), 33.8 parts by mass of benzyl alcohol, 3.8 parts by mass of methanol, and 2.9 parts by mass of propylene glycol as the component (b), and 31.7 parts by mass of water as another component were mixed to prepare a cleaning agent.

The cleanability was evaluated with the laminated film (III) under the condition shown in Table 1. The results are shown in Table 1.

Example 8

5 parts by mass of potassium hydroxide, 5 parts by mass of sodium hydroxide, and 17.9 parts by mass of ethanolamine as the component (a), 28.1 parts by mass of benzyl alcohol, 9.4 parts by mass of methanol, and 2.9 parts by mass of propylene glycol as the component (b), and 31.7 parts by mass of water as another component were mixed to prepare a cleaning agent.

The cleanability was evaluated with the laminated film (III) under the condition shown in Table 1. The results are shown in Table 1.

Example 9

5 parts by mass of potassium hydroxide, 5 parts by mass of sodium hydroxide, and 17.9 parts by mass of monoethanolamine as the component (a), 18.8 parts by mass of benzyl alcohol, 18.8 parts by mass of methanol, and 2.9 parts by mass of propylene glycol as the component (b), and 31.7 parts by mass of water as another component were mixed to prepare a cleaning agent.

The cleanability was evaluated with the laminated film (III) under the condition shown in Table 1. The results are shown in Table 1.

Example 10

5 parts by mass of potassium hydroxide, 5 parts by mass of sodium hydroxide, and 17.9 parts by mass of monoethanolamine as the component (a), 33.8 parts by mass of benzyl alcohol, 3.8 parts by mass of hexafluoro-2-propanol, and 2.9 parts by mass of propylene glycol as the component (b), and 31.7 parts by mass of water as another component were mixed to prepare a cleaning agent.

The cleanability was evaluated with the laminated film (III) under the condition shown in Table 1. The results are shown in Table 1.

Example 11

5 parts by mass of potassium hydroxide, 5 parts by mass of sodium hydroxide, and 17.9 parts by mass of monoethanolamine as the component (a), 28.1 parts by mass of benzyl alcohol, 9.4 parts by mass of hexafluoro-2-propanol, and 2.9 parts by mass of propylene glycol as the component (b), and 31.7 parts by mass of water as another component were mixed to prepare a cleaning agent.

The cleanability was evaluated with the laminated film (III) under the condition shown in Table 1. The results are shown in Table 1.

Example 12

5 parts by mass of potassium hydroxide, 5 parts by mass of sodium hydroxide, and 17.9 parts by mass of monoethanolamine as the component (a), 18.8 parts by mass of benzyl alcohol, 18.8 parts by mass of hexafluoro-2-propanol, and 2.9 parts by mass of propylene glycol as the component (b), and 31.7 parts by mass of water as another component were mixed to prepare a cleaning agent.

The cleanability was evaluated with the laminated film (III) under the condition shown in Table 1. The results are shown in Table 1.

Example 13

5 parts by mass of potassium hydroxide, 5 parts by mass of sodium hydroxide, and 17.9 parts by mass of monoethanolamine as the component (a), 28.1 parts by mass of benzyl alcohol, 9.4 parts by mass of ethanol, and 2.9 parts by mass of propylene glycol as the component (b), and 31.7 parts by mass of water as another component were mixed to prepare a cleaning agent.

The cleanability was evaluated with the laminated film (III) under the condition shown in Table 1. The results are shown in Table 1.

Example 14

5 parts by mass of potassium hydroxide, 5 parts by mass of sodium hydroxide, and 17.9 parts by mass of monoethanolamine as the component (a), 28.1 parts by mass of benzyl alcohol, 9.4 parts by mass of 2-propanol, and 2.9 parts by mass of propylene glycol as the component (b), and 31.7 parts by mass of water as another component were mixed to prepare a cleaning agent.

The cleanability was evaluated with the laminated film (III) under the condition shown in Table 1. The results are shown in Table 1.

Comparative Example 1

30 parts by mass of potassium hydroxide as the component (a) and 70 parts by mass of water as another component were mixed to prepare a cleaning agent. The cleanability was evaluated with the laminated films (I) and (III) under the condition shown in Table 1. The results are shown in Table 1.

Reference Example 1

As Reference Example, a base material film (IV) having no functional layer (polyethylene terephthalate film, thickness: 52 μm) was prepared as a specimen.

The specimen was immersed in the same cleaning agent as in Example 1 for 5 minutes, and the change of the thickness of the base material was measured by measuring the thickness with "Thickness Gauge ID-C112X/1012X", produced by Mitsutoyo Corporation.

The case where the thickness change was 3 μm or more was evaluated as A, and the case where the thickness change was less than 3 μm was evaluated as B. The results are shown in Table 1.

TABLE 1

| | Cleaning condition | | | | | | Base material |
|---|---|---|---|---|---|---|---|
| | Temperature condition (° C.) | Immersion time (min) | Laminated film | | | | film |
| | | | (I) 5 × 5 cm | (II) 5 × 5 cm | (II) 1 × 5 cm | (III) 5 × 5 cm | (IV) 5 × 5 cm |
| Example 1 | room temperature (20° C.) | 5 | | | | a | |
| | 80° C. | 1 | s | | | s | |
| | | 10 | | | b | | |
| | | 20 | | a | a | | |
| Example 2 | room temperature (20° C.) | 5 | | | | s | |
| | 60° C. | 1 | s | | | s | |
| | | 10 | | | b | | |
| | | 20 | | b | a | | |
| Example 3 | 70° C. | 1 | a | | | s | |
| Example 4 | 60° C. | 1 | s | | | s | |
| Example 5 | 60° C. | 1 | | | | a | |
| Example 6 | 60° C. | 5 | | | | s | |
| | | 10 | s | | | | |
| | 80° C. | 1 | | | | s | |
| | | 10 | s | | | | |
| Example 7 | 60° C. | 1 | | | | s | |
| Example 8 | 60° C. | 1 | | | | s | |
| Example 9 | 60° C. | 1 | | | | s | |
| Example 10 | 60° C. | 1 | | | | s | |
| Example 11 | 60° C. | 1 | | | | s | |
| Example 12 | 60° C. | 1 | | | | s | |
| Example 13 | 60° C. | 1 | | | | s | |
| Example 14 | 60° C. | 1 | | | | s | |
| Comparative Example 1 | 90° C. | 1 | c | | | c | |
| | | 5 | | | | c | |
| | | 10 | c | | | | |
| Reference Example 1 | 80° C. | 5 | | | | | A |

Reference Example 2

For confirming the best mode of the alcohol compound in the cleaning agent, the cleanability was evaluated by the following standard for Examples 2 and 7 to 12 in which the cleaning condition was changed to a cleaning temperature of changed to 40° C. and an immersion time of 1.2 minutes. The results are shown in Table 2.

The cleanability was evaluated by subjecting the surface of the laminated film after cleaning to the quantitative analysis of Si element with the fluorescent X-ray analyzer in the same manner as above.

The removal rate of the functional layer was judged by the following standard.

a (good): removal rate of 50 to 100% b (fair): removal rate of 0 to 49%

TABLE 2

| | | Cleaning condition | | Laminated polyester film |
|---|---|---|---|---|
| | Evaluation target | Temperature condition (° C.) | Immersion time (min) | (III) 5 × 5 cm |
| Reference Example 2 | Example 2 | 40 | 12 | b |
| | Example 7 | | | b |
| | Example 8 | | | a |
| | Example 9 | | | b |
| | Example 10 | | | a |
| | Example 11 | | | b |
| | Example 12 | | | b |

According to the recycling system of the present invention and the recycling method of the present invention, the functional layer can be peeled from the laminated polyester film with a cleaning agent dissolving the polyester film, and thereby the polyester film can be efficiently recycled.

As shown by the results of Reference Example 1, it is understood that the base material film (IV) as the polyester film is thinned by melting a part of the surface thereof. Accordingly, the recycling system of the present invention effectively peels the functional layer with the cleaning agent by dissolving a part of the surface of the polyester film as the base material.

REFERENCE SIGN LIST

10: Recycling system
11: Functional layer removing means
12: Rinsing means
13: Drying means
14: Unwinding means
15: Winding means
16: Laminated polyester film
18: Pellet producing means
20: Recycling system
21: Functional layer removing means
22: Rinsing means
23: Drying means
24: Cutting means
25: Belt conveyer
26: Laminated polyester film in bulk form (waste material)
27: Laminated polyester film in flake form
28: Pellet producing means

The invention claimed is:

1. A polyester recycling system comprising:

a tank to remove a functional layer from a laminated polyester film including a polyester film having on a surface thereof the functional layer as a recovered waste material, by immersing the laminated polyester film with a cleaning agent dissolving the polyester film;

a winding roll to continuously wind up the polyester film if the polyester film is a roll form, or a belt conveyer if the polyester film is in a flake form to recover the polyester film, from which the functional layer has been removed, to produce a recovered polyester film; and wherein the functional layer comprises at least one selected from the group consisting of a pressure-sensitive adhesive layer, a hard coat layer, a release layer, a decorative layer, a light shielding layer, an ultraviolet ray shielding layer, an adhesion promoting layer, an antistatic layer, a refractive index regulating layer, and an oligomer blocking layer, the functional layer and the polyester film are directly in contact to each other before the removing the functional layer, and the cleaning agent comprises a benzyl alcohol.

2. The polyester recycling system according to claim 1, wherein the cleaning agent further contains an alkalinizing agent.

3. The polyester recycling system according to claim 1, wherein the polyester recycling system further comprises a rinsing means of rinsing out the cleaning agent attached to the polyester film, from which the functional layer has been removed, in the functional layer removing means.

4. The polyester recycling system according to claim 1, wherein the waste material is a laminated polyester film in a roll form or a bulk form.

5. The polyester recycling system according to claim 1, wherein the polyester recycling system further comprises an unwinding device or a cutting device, preceding the functional layer removing means.

6. The polyester recycling system according to claim 1, wherein a roll-to-roll method is applied to the polyester recycling system.

7. A polyester recycling method comprising:

recovering a laminated polyester film including a polyester film having on a surface thereof a functional layer as a waste material;

removing the functional layer from the laminated polyester film, with a cleaning agent dissolving the polyester film;

recovering the polyester film, from which the functional layer has been removed; and producing a recycled polyester product with the polyester film recovered in the recovering as a raw material, wherein the functional layer comprises at least one selected from the group consisting of a pressure-sensitive adhesive layer, a hard coat layer, a release layer, a decorative layer, a light shielding layer, an ultraviolet ray shielding layer, an adhesion promoting layer (primer layer), an antistatic layer, a refractive index regulating layer, and an oligomer blocking layer, the functional layer and the polyester film are directly in contact to each other before the removing the functional layer, and the cleaning agent comprises a benzyl alcohol.

8. The polyester recycling method according to claim 7, wherein the producing step includes a pellet producing step of pelletizing the polyester film, from which the functional layer has been removed.

9. The polyester recycling method according to claim 7, wherein the cleaning agent further contains an alkalinizing agent.

10. The polyester recycling method according to claim 7, wherein the polyester recycling method further comprises rinsing out the cleaning agent attached to the polyester film, from which the functional layer has been removed, in the functional layer removing step.

11. The polyester recycling method according to claim 7, wherein in the recovering, the waste polyester film in a roll form or a bulk form is recovered.

12. The polyester recycling method according to claim 7, wherein the polyester recycling method further comprises an unwinding step or a cutting step, before the removing the functional layer and after the recovering a laminated polyester film.

13. The polyester recycling method according to claim 7, wherein the polyester recycling method is performed by a roll-to-roll method.

14. The polyester recycling system according to claim 1, wherein the functional layer is a single layer.

15. The polyester recycling system according to claim 1, wherein the pressure-sensitive adhesive layer includes at least one selected from the group consisting of an acrylic resin, a rubber resin, and a silicone resin, the hardcoat layer includes at least one hardened material selected from the group consisting of a monofunctional (meth)acrylate, a polyfunctional (meth)acrylate, and a reactive silicon compound, the release layer includes at least one selected from the group consisting of a curable silicone resin, a modified silicone resin obtained through graft polymerization with a urethane resin, an epoxy resin, a long-chain alkyl group-containing compound, fluorine compound, and hydrocarbon wax, the decorative layer includes at least one selected from the group consisting of a polyurethane resin, a vinyl resin, a polyamide resin, a polyester resin, an acrylic resin, and a polyvinyl acetal resin, the light shielding layer or the ultraviolet ray shielding layer includes at least one selected from the group consisting of an inorganic filler and an organic filler, the adhesion promoting layer (primer layer) includes at least one selected from the group consisting of a polyurethane resin, a vinyl resin, a polyamide resin, a polyester resin, an acrylic resin, and a polyvinyl acetal resin, the antistatic layer includes at least one selected from the group consisting of nonionic, cationic, anionic, and amphoteric surfactants, a conductive polymer, graphene, carbon black, and carbon nanotubes (CNT), the refractive index regulating layer includes at least one selected from the group consisting of a polyester resin, an acrylic resin, a urethane resin, a polycarbonate resin, an epoxy resin, an alkyd resin, a urea resin, a fluorine resin, and a metal oxide, and the oligomer blocking layer includes at least one selected from the group consisting of an amine compound and an ionic resin.

16. The polyester recycling system according to claim 1, wherein the polyester recycling system further includes a pellet producing device including an extruder to form pellets with the recovered polyester film as a raw material by melting the recovered polyester film and pelletizing the melted polyester film by the extruder.

17. The polyester recycling system according to claim 1, wherein the polyester recycling system further includes an extruder to produce a polyester product.

* * * * *